United States Patent [19]

Katagiri et al.

[11] 4,418,964
[45] Dec. 6, 1983

[54] BRAKING HYDRAULIC PRESSURE CONTROL VALVE IN A DUAL-CIRCUIT BRAKE SYSTEM

[75] Inventors: Masayoshi Katagiri; Yoshihisa Nomura, both of Toyota; Hiroshi Kawaguchi, Mishima; Shuho Nishina, Susono; Eiji Miura, Kariya, all of Japan

[73] Assignees: Toyota Jidosha Kogyo Kabushiki Kaisha, Toyota; Aisin Seiki Kabushiki Kaisha, Aichi, both of Japan

[21] Appl. No.: 316,632

[22] Filed: Oct. 30, 1981

[30] Foreign Application Priority Data

Mar. 6, 1981 [JP] Japan ............................ 56-31641[U]

[51] Int. Cl.³ .............................................. B60T 8/26
[52] U.S. Cl. ..................................... 303/6 C; 188/349
[58] Field of Search .................... 303/6 C, 6 R, 22 A, 303/22 R, 23 A, 23 R, 111, 6 A, 84 A, 84 R, 52; 188/195, 349, 345, 16, 354

[56] References Cited

U.S. PATENT DOCUMENTS

| 4,101,176 | 7/1978 | Carre et al. | 188/195 X |
| 4,199,196 | 4/1980 | Teluo | 303/22 R X |
| 4,203,627 | 5/1980 | Kono | 303/6 C |
| 4,278,299 | 7/1981 | Tsuda et al. | 188/349 X |

FOREIGN PATENT DOCUMENTS

1444397 7/1976 United Kingdom ............. 303/22 R

Primary Examiner—Douglas C. Butler
Attorney, Agent, or Firm—Parkhurst & Oliff

[57] ABSTRACT

A hydraulic pressure control valve for a dual-circuit brake system of a vehicle. In this control valve a pair of valve pistons for controlling the braking hydraulic pressure delivered to each of rear wheel brakes are disposed in a housing parallelly and imparted with biasing force directed inwards of the housing by one biasing device. The biasing device is assembled or set within a cover of cup-shape such that the biasing device has been given a preload substantially equal to a biasing force necessary for the control valve before the cover is fixed to the valve housing. The biasing device includes a swingable guide rod attached at one end thereof to the cover with a pivot pin, a sliding member slidably fitted on the guide rod, and a compression spring disposed between the sliding member and a free end of the guide rod for biasing the sliding member toward the pivoted end of the guide rod. The guide rod is provided with a projection for stopping axial movement of the sliding member due to the biasing force of the spring. When the cover is attached to the valve housing the sliding member abuts on ends of the valve pistons and consequently is separated from the projection for transmitting the biasing force of the spring to the valve pistons.

15 Claims, 12 Drawing Figures

BRAKING HYDRAULIC PRESSURE CONTROL VALVE IN A DUAL-CIRCUIT BRAKE SYSTEM

BACKGROUND OF THE INVENTION

This invention relates to a braking hydraulic pressure control valve used in a dual-circuit brake system wherein braking hydraulic pressure generated in a master cylinder is delivered to each of the left-and right rear-wheel-brakes of a vehicle through a pair of mutually independent conduit circuits.

It is commonly practiced in vehicles that a master cylinder is connected to each wheel cylinder disposed on the left-and right rear wheels by a pair of mutually independent conduit circuits for delivering the braking hydraulic pressure generated in the master cylinder due to operation of a brake operation member to the wheel cylinders independently from each other.

The applicant of this invention recently developed a control valve for controlling the braking hydraulic pressure delivered to the left-and right rear wheels in a dual-circuit brake system, wherein valve pistons of a pair of proportioning valves were parallelly disposed in a housing and one biasing device was shared by both valve pistons. In this control valve, the biasing device comprises (a) a guide rod swingably retained at one end thereof with a pivot pin, at a position middle of the pair of valve pistons, (b) a transmission or sliding member provided with a cylindrical portion slidably fitted on the guide rod and an action portion abuttable on rear ends of the valve pistons, (c) a compression coil spring anchored between the transmission member and the guide rod for constantly imparting biasing force to the rear ends of the valve pistons, and (d) a stopper projection extended from one end of the guide rod on the side thereof retained by the pivot pin for being fitted with a predetermined clearance into a stopper hole formed in parallel with the valve pistons within the housing so as to limit the swinging of the guide rod within a minute angular range from a straight center line passing the axis of the pivot pin and parallel to the axes of the valve pistons.

In this braking hydraulic pressure control valve, resilient force of one spring is equally distributed by a transmission member to a pair of valve pistons and an ununiformity of operational stroke between the pair of the valve pistons owing to errors in manufacturing can be absorbed by the swinging of a minute angle of the transmission member and the guide rod. And when one of the pair of independent conduit circuits is damaged, the transmission member is straight linearly moved on a retaining member which has been blocked of swinging exceeding a predetermined range. It causes the valve piston receiving the hydraulic pressure from the normal conduit circuit to compress the coil spring by itself, so the hydraulic pressure in the normal conduit circuit advantageously becomes two times as high as when the both conduit circuits are normal before the hydraulic pressure control begins to take place. Besides, the guide rod may be attached to the housing or a member secured thereto with a simple pivot pin and the transmission member is allowed to be slidably fitted on the outside of the guide rod of bar shape, which makes the manufacturing of the two members quite easy.

SUMMARY OF THE INVENTION

The primary object of this invention is to provide a braking hydraulic pressure control valve maintaining the above-mentioned effects and in addition further compact in size.

According to the invention there is provided a hydraulic pressure control valve for a dual-circuit brake system with a pair of independent conduit circuits for each wheel cylinder on left-and right rear wheels of a vehicle so as to deliver a braking hydraulic pressure generated in a master cylinder by operation of a brake operation member, the control valve being provided with a pair of valve pistons, for controlling the braking hydraulic pressure delivered to each wheel cylinder on the left-and right rear wheels, disposed in a housing parallelly and in such a manner as to be projected at the rear end thereof out of the housing while being imparted with biasing force directed inwards the housing by a biasing device, the biasing device comprising (a) a cover of container shape secured to the housing in such a state as to cover a surface thereof at which rear ends of the pair of valve pistons are projected outwards, (b) a guide rod attached, at one end portion thereof to the cover with a pivot pin, at a position middle between the pair of valve pistons, for being rotatable in a parallel direction to a plane including axes of the pair of valve pistons, (c) a sliding member provided with a cylindrical portion slidably fitted on the guide rod and an action portion abuttable on the rear ends of the pair of valve pistons, (d) a spring for imparting the pair of valve pistons biasing force via the sliding member by means of urging the sliding member onto the valve pistons, and (e) stopper means disposed on the cover for limiting the movement of the guide rod within a predetermined angular range from a straight center line passing an axis of the pivot pin and parallel to the axes of the pair of valve pistons, whereby when either one of the pair of independent conduit circuits is damaged one valve piston which receives braking hydraulic pressure from the normal conduit circuit rotates the guide rod as far as it abuts on the stopper means and pushes the sliding member back along the rotated guide rod resisting the biasing force of the spring before the control of the braking hydraulic pressure begins to take place.

As the guide rod, in this structure, is pivotally supported by the cover, the space conventionally required for attaching the guide rod onto the housing in the middle of the two valve pistons can be eliminated, which allows to narrow the distance between the two valve pistons. This structure provides advantages of: diminished transverse dimensions of the control valve as measured across the length thereof; reduced weight and manufacturing costs thereof; and decreased mass thereof contributing to reduction in space required for attaching the same to the vehicle.

Another object of this invention is to provide a hydraulic pressure control valve composed of as small number of parts as possible, each of which is easy to be manufactured.

Still another object of this invention is to provide an easy assemblable hydraulic pressure control valve.

Another object of this invention is to provide a hydraulic pressure control valve containing a biasing device which can be incorporated in advance as a subassembly within a cover at a removed status from the valve housing.

Another object of this invention is to provide a hydraulic pressure control valve having a biasing device which allows checking of the biasing load thereof before being attached to the valve housing.

Another object of this invention is to provide a hydraulic pressure control valve wherein the valve piston is smoothly movable so as to be able to stably control the braking hydraulic pressure.

Still another object of this invention is to provide a hydraulic pressure control valve wherein adjustment of the biasing force is possible.

Other objects and features necessary for attaining the above-mentioned objects will be naturally understood from the careful study of the undermentioned description in conjunction with the appended claims and drawings.

DETAILED DESCRIPTION OF THE PREFERRED EMBODIMENTS

Referring to the appended drawings preferred embodiments will be described in detail hereinunder.

In two independent pressure chambers 14, 16, a first and a second, in a master cylinder 10 an equal hydraulic pressure is produced in response to depressing of a brake pedal 12. The hydraulic pressure produced in the first pressure chamber 14 is led through a conduit 18 to an inlet port 22 of a braking hydraulic pressure control valve 20, for being further led via an outlet port 24 and a conduit 26 to a wheel cylinder 28 of a left side front wheel and on the other hand via an outlet port 30 to a wheel cylinder 32 of a right side rear wheel. The hydraulic pressure produced in the second pressure chamber 16 is similarly led, by way of one inlet port and two outlet ports, disposed at symmetrical positions to the inlet port 22 and the outlet ports 24, 30, as well as conduits 36, 38 to a wheel cylinder 40 of a right side front wheel and a wheel cylinder 42 of a left side rear wheel. Those ports however are not illustrated, with the right half of FIG. 1 at the upper portion thereof being indicative of an external view of an attaching portion of the control valve 20.

The control valve 20 includes a pair of mutually parallel P valves 43, 44, whose two valve pistons 46, 48 are respectively biased by a biasing device 50.

Figure 1:
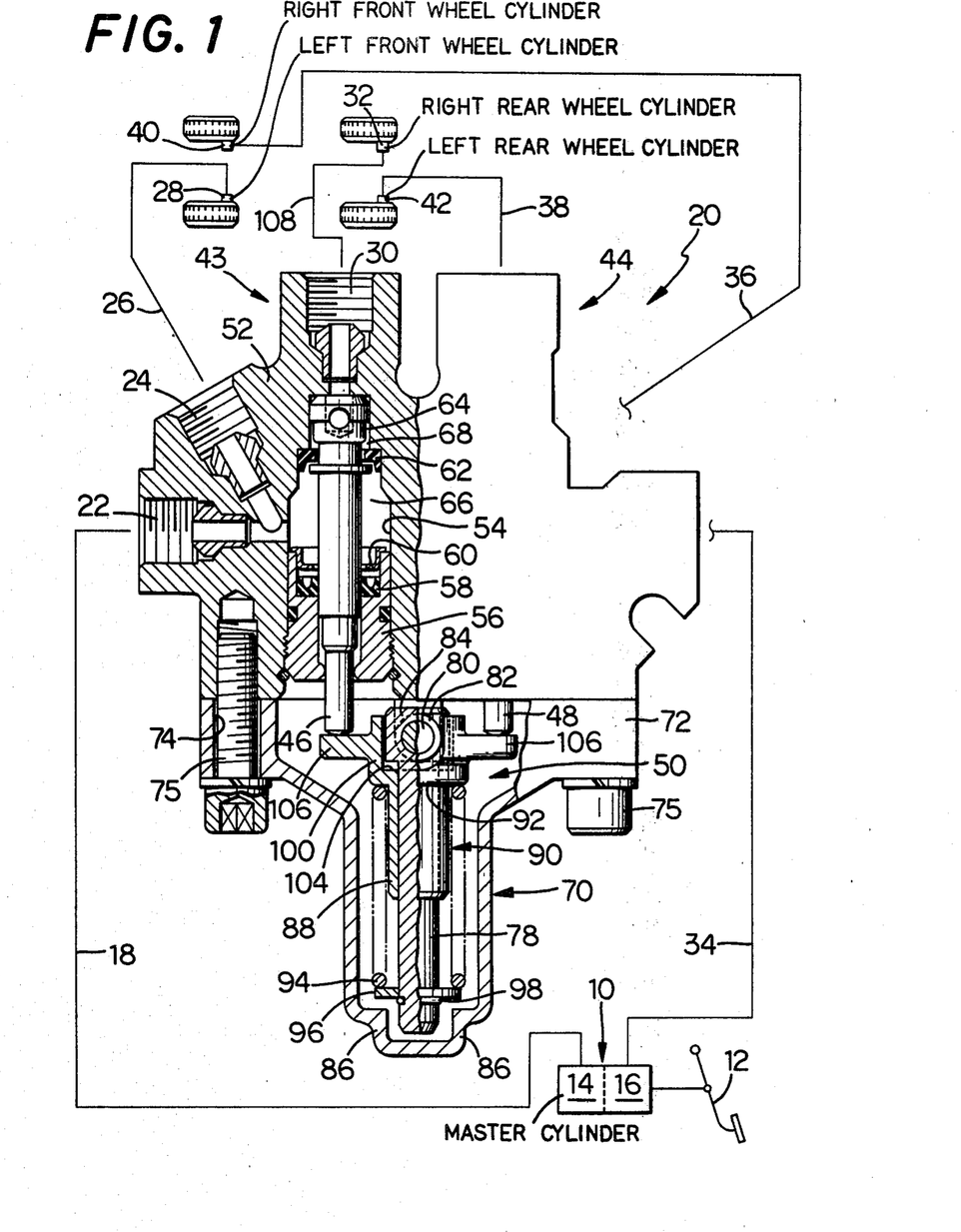
FIG. 1 is an elevational view of an embodiment of a hydraulic pressure control valve, with an essential part being illustrated in section.

The valve piston 46 is accommodated in a stepped bore 54 formed in a housing 52 for being slidably fitted through a central hole formed in a sleeve 56 which is threaded into an opening of the stepped bore 54 so as to project out of the sleeve 56 at the rear end thereof, that is, lower end in FIG. 1. The sleeve 56 is provided on the side faced an inlet chamber 66 of the P valve 43 with a recess portion having an oil seal 58 for ensuring the oil tightness between the sleeve 56 and the valve piston 46. In the recess portion a seal cover 60 is secured so as to cover the oil seal 58. On a step formed on the internal surface of the stepped bore 54 a valve seat 62, an elastic body of a cap shape, is mounted. Close contact with and separation from the valve seat 62 of a valve 64 of the valve piston 46 executes communication and interruption between the inlet chamber 66 and an outlet chamber 68. Another stepped bore provided with a sleeve, an oil seal, and a valve seat similarly to the above is symmetrically disposed to the stepped bore 54, not being illustrated, though.

On the bottom surface of the housing 52, i.e., the side where the rear end of the valve pistons 46, 48 are projected, a cover 70 of a container shape is secured in such a manner as to envelop the bottom surface and the biasing device 50. The securing or fastening of the cover 70 is made by a pair of bolts 75 inserted through a pair of bolt holes 74 formed at suitable places in a flange 72 thereof (see FIG. 3). On the internal wall surface of the cover 70 on the portion near the housing 52 (the upper portion in FIG. 1 which will be called hereinafter upper portion) a pair of recesses or notches 76, 76 of U-shape are formed face-to-face in the middle of the two valve pistons 46, 48. This U-shape notch 76 is open upwards, but not open through the cover 70, still leaving thin wall portion as clearly illustrated in FIG. 3.

Figure 2:
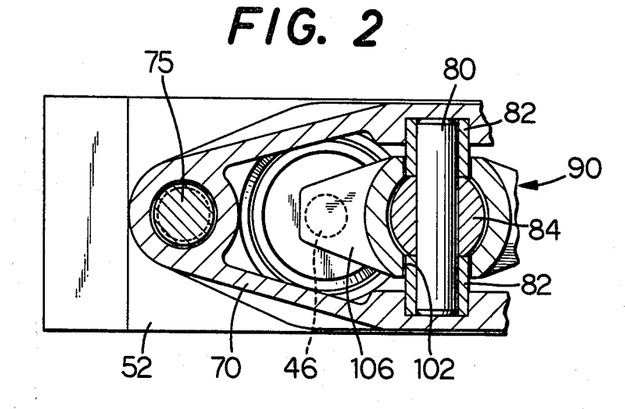
FIG. 2 is a transverse sectional bottom view of an essential part of the hydraulic pressure control valve.
Figures 3, 4, 5:
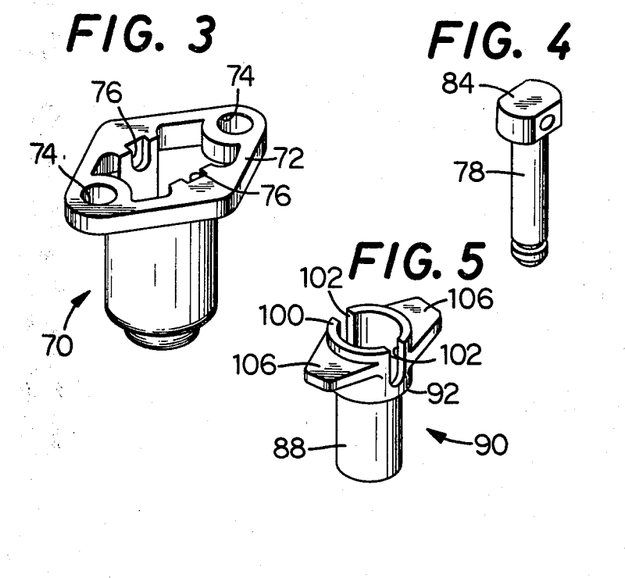
FIGS. 3-5 are respectively a perspective view of a cover, a guide rod, and a sliding member of the hydraulic pressure control valve.
Figure 6:
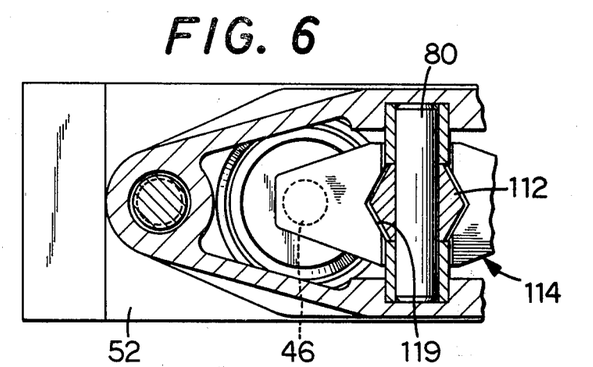
FIGS. 6 and 7 are respectively a transverse sectional bottom view and an axial elevational sectional view of an essential part of another embodiment of the hydraulic pressure control valve.
Figure 7:
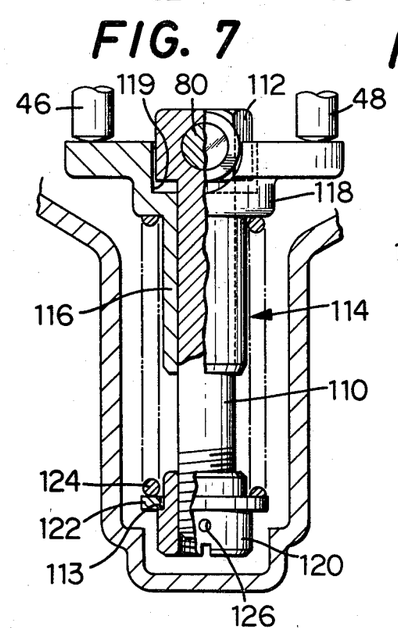
Figure 8:
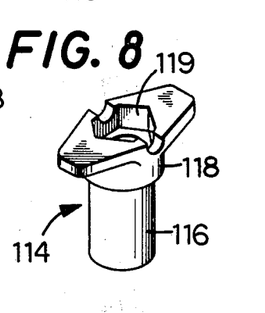
FIGS. 8-9 are respectively a perspective view of a sliding member and a guide rod shown in FIGS. 6 and 7.

In the notches 76, 76 a pivot pin 80 for rotatably supporting a guide rod 78 is carried as shown in FIG. 2 via a pair of cylindrical bearings 82, 82 fitted on either end thereof. The guide rod 78 is provided on one end thereof with a head 84, a kind of projection projected in a radial direction, formed integrally, and it is supported by the pivot pin 80 pierced through the head 84 thereof rotatably in a parallel direction to a plane including the axes of the valve pistons 46, 48, the other end (free end) of the guide rod 78 being confronted with a predetermined distance to either stopper 86 disposed face-to-face on the internal wall surface of the lower portion in the cover 70. The two stoppers 86 consist of two side portions of an internal surface of a blind hole formed in a bottom wall of the cover 70 and function to restrict the rotation of the guide rod 78, when the angle formed by the axis of the guide rod 78 and a straight line passing the axis of the pivot pin 80 and parallel to the axes of the valve pistons 46, 48 has reached a predetermined value, by abutting the same so as not to allow further rotation thereof. On this guide rod 78 a sliding member 90 having a cylindrical portion 88 which is provided with a stepped portion 92 on the external surface thereof is fitted. On the stepped portion 92 one end of a compression coil spring 94 which is wound about the cylindrical portion 88 is abutted to urge the same. The other end of the spring 94 is received by a seat plate 96 fixed on the free end of the guide rod 78, which seat plate 96 is carried by a snap ring 98 fitted in an annular groove formed on the guide rod 78. A large diametered portion 100 on the upper end of the cylindrical portion 88 accommodates the head 84 of the guide rod 78 therein and is provided with, on diametrically opposite wall portions as shown in FIG. 5, a pair of U-shaped notches 102, 102 open upwards. These notches 102, 102 respectively have such a width as to receive the bearing 82 therein with a minute clearance inbetween and a bottom portion with an identical radius of curvature with the radius of the bearing 82, so that the sliding member 90 may be prevented from rotating about the axis of the guide rod 78. The depth of the U-shaped notch 102 is determined such that an internal stepped portion 104 of the cylindrical portion 88 does not interfere with the bearing 82 when it is in contact with the head 84 of the guide rod 78. From the large diametered portion 100 of the cylindrical portion 88 an action portion 106 is projected in the radial direction thereof, which abuts at either end portion thereof the rear end (lower end) of the valve pistons 46, 48 for imparting the biasing force of the coil spring 94 to the pair of valve pistons 46, 48.

Operational function of the hydraulic pressure control valve 20 of such a structure will be described next.

Depressing of the brake pedal 12 generates an equal braking hydraulic pressure in each of the first pressure chamber 14 and the second pressure chamber 16 of the master cylinder 10. The hydraulic pressure produced in the first pressure chamber 14 is delivered via the conduit 18 and the inlet port 22 to the inlet chamber 66 for being further delivered via the outlet port 24 connected thereto and the conduit 26 to the wheel cylinder 28 on the left side front wheel; and the hydraulic pressure in the inlet chamber 66 is also delivered via the outlet chamber 68, the outlet port 30, and the conduit 108 to the wheel cylinder 32 on the right side rear wheel. The hydraulic pressure thus transmitted to the wheel cylinders (28, 32) function to brake the vehicle wheels. Just similarly the hydraulic pressure produced in the second pressure chamber 16 of the master cylinder 10 is delivered to the wheel cylinders 40, 42 on the right side front wheel and the left side rear wheel for the same purpose.

The hydraulic pressure delivered to the inlet chamber 66 and the outlet chamber 68 is continuously raised in response to the depressing of the brake pedal 12. As the pushout force affecting the valve piston 46 however overcomes, when the above hydraulic pressure is so raised as to exceed a predetermined value, the biasing force of the biasing device 50 owing to the action of the hydraulic pressure in the outlet chamber 68, the valve 64 is moved so as to seat on the valve seat 62. Communication between the inlet chamber 66 and the outlet chamber 68 is interrupted once herewith, but further rising of the hydraulic pressure in the inlet chamber 66 separates the valve 64 from the valve seat 62, which raises as a result the hydraulic pressure in the outlet chamber 68. The rising of the hydraulic pressure in the outlet chamber 68 forces the valve 64 to seat on the valve seat 62 again. Repetition of this type movement of the valve 64 constitutes the well known hydraulic pressure controlling or reducing action.

Although both valve pistons 46, 48 are so designed as to be equal in their stroke (shift) amount, it can not necessarily be ensured that both are finished completely equal because of inevitable errors of some kinds such as those in manufacturing. When one valve piston, for example, the valve piston 48 on the right side in FIG. 1 is already seated on the valve seat the other valve piston 46 may not be seated yet on the valve seat 62. On such an occasion the amount of projection of the valve piston 46 becomes larger than that of the other valve piston 48 because of continued increasing of the hydraulic pressure in the outlet chamber 68, and the sliding member 90 and the guide rod 78 are counterclockwise, in FIG. 1, rotated at this time up to a position where the biasing forces acting on both valve pistons 46, 48 are equalized so as to rectify the imbalance of forces acting on both pistons, which will make the braking pressure to both rear wheels equal. At this time the guide rod 78 does not abut on the stopper 86, because the clearance between the two members is so determined in advance.

In the event of an oil leakage in one of the two circuits, for example on the conduit 34, the hydraulic pressure produced in the master cylinder 10 is led through the conduit 18 to the inlet port 22 alone. When the hydraulic pressure in the outlet chamber 68 exceeds the predetermined value, the push-out force only of the valve piston 46 affects the action portion 106 of the sliding member 90. So the sliding member 90 and the guide rod 78 under the influence of the push-out force only from the valve piston 46 are rotated largely in the counterclockwise direction, in FIG. 1, and the end portion of the guide rod 78 will consequently abut on the stopper 86 so as to prevent the sliding member 90 and the guide rod 78 from being further rotated. The valve 64 is not at this stage seated on the valve seat 62. When the push-out force of the valve piston 46 overcomes the biasing force, due to further continued rising of the hydraulic pressure in the outlet chamber 68, the valve piston 46 is therefore pushed outside while sliding downwards the sliding member 90 so as to be seated at the valve 64 thereof on the valve seat 62. Then the well known hydraulic pressure controlling action is initiated at this stage, when the hydraulic pressure in the outlet chamber 68 is raised almost two times as high as at the normal time, because only the valve piston 46 receives all of the biasing force of the coil spring 94 at this time. Therefore, the initial value of the hydraulic pressure controlling delivered to the wheel cylinder 32 of the right side rear wheel is almost two times as high as at the normal time.

Incidentally, the control valve 20 is greatly featured in that the biasing device 50 for biasing the valve pistons 46, 48 is mounted on the cover 70. It is allowable indeed that the biasing device 50 is mounted on the housing. When the biasing device is mounted on the housing an extra space for placing a pivot to support the same must be kept on the housing. As this pivot is placed in the middle of a pair of valve pistons it inevitably requires to widen the distance between the valve pistons, which consequently enlarges the width of the control valve itself, namely size larging of the control valve. Contrary to this type, disposition of the pivot on the cover which will dispense with that space, allowing the control valve to be compacted in size. Another merit of mounting the biasing device on the cover 70 resides in that the disposition of the stopper 86 on the cover 70, on which the pivot pin 80 is also mounted, greatly contributes to enhancing relative dimensional precision between the stopper and the guide rod because of elimination of the assembling errors when the control valve is assembled, and allowing advantageously to check the precision before assembling while it is impossible in a case wherein the biasing device is mounted on the housing. Furthermore, the stopper 86 is formed in the neighborhood of the bottom of the cover 70 where the distance from the pivot pin 80 as the rotation center of the guide rod 78 is the greatest so that the allowed rotation range for the guide rod 78 may be determined more precisely.

The above described control valve 20 is provided with further features as mentioned hereunder.

As the U-shaped notches 76 for retaining the pivot pin 80 are allowed to be formed simultaneously with the formation of the cover 70 by means of die casting or the like method, machining for making the bores to pierce the pivot pin 80 can be eliminated. As the U-shaped notches 76 are open upwards for allowing the pivot pin 80 press-fittedly pierced through the head 84 of the guide rod 78 to be rightly positioned only by being put thereinto in a direction perpendicular to the axis of the pivot pin 80, otherwise necessitated positioning parts required when the pin is slidably pierced through the hole are all eliminated. All of those stated above are helpful in diminishing man-hours and cost for assembling the control valve, and in improving the assembling quality. Another advantage of the U-shaped notches 76 lies in that they are formed on the inner side of the wall of the cover 70 not to be cut open to the outer side, which allows high performance of sealing and dispensing of otherwise needed parts and work of sealing, and also allows axial positioning of the pivot pin 80 without any positioning parts even when the pin 80 is slidably pierced through the guide rod 78.

The guide rod 78 is provided with the head 84, as mentioned earlier, radially projecting, which may be abutted on the internal stepped portion 104 of the sliding member 90. On the other end of the guide rod 78 the seat plate 96 for receiving one end of the coil spring 94 is attached. Between this seat plate 96 and the external stepped portion 92 of the cylindrical portion 88 the coil spring 94 is set. This type structure allows the guide rod 78, the sliding member 90, and the spring 94 can be put together into the biasing device 50 as a sub-assembled part. And the coil spring 94 can also be given a preload, which allows imparting a desired set load only by slightly compressing it when the control valve 20 is assembled. Such circumstances have brought about a great deal of efficiency raising to the assembly of the control valve. As checking whether the preload imparted to the coil spring 94 is agreeable with the predetermined value and adjustment of the thus imparted preload by means of inserting a spacer shim(s) are made easy to carry out, it has become possible to give a stable biasing force to the control valve and to prevent variation of performance among many P valves manufactured.

As the necessitated amount of compression for the coil spring 94 when it is assembled into a control valve 20 is small, there is little fear that the valve pistons 46, 48 are imparted force in inclined direction against the axis thereof when the control valve 20 is assembled in comparison to a case wherein the coil spring 94 is compressed by screwing up of the bolt from its natural length. Particularly when the valve piston 46 is made of a soft metal such as an aluminum alloy deformation or scar due to prying function which are liable to take place between the valve piston 46 and the sleeve 56 can be evaded so as to maintain the functional features of the P valve. The present structure wherein the coil spring 94 is allowed to swing or rotate together with the guide rod 78 and the sliding member 90 prevents the coil spring 94 from receiving bending load so as not to produce difference of the biasing force to the pair of valve pistons in comparison to a case wherein one end of the coil spring 94 is anchored to the cover 70.

The sliding member 90 is provided with a pair of U-shaped notches 102, 102, which function for positioning or anti-rotation of the sliding member 90 itself by accommodating the bearings 82, 82 therein. Although there is an idea of attempting to stably position the sliding member 90 through engagement of the action portion 106 thereof and the valve pistons 46, 48, it may adversely affect the stable operation of the valve pistons 46, 48 because of possible prying force applied on the valve pistons 46, 48. Particularly when the valve pistons 46, 48 are made of a soft metal such as an aluminum alloy they are liable to have scratches or abnormal wearing. The above-mentioned structure of the control valve 20 does not allow the valve pistons to take part in the positioning of the sliding member 90, which prevents the occurrence of the disadvantages stated above for maintaining the control performance of the control valve 20 and meritoriously ensures simple configuration of the action portion 106.

Another embodiment of this invention will be described with reference to FIGS. 6-9.

Figure 9:
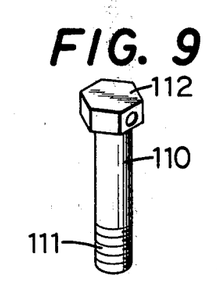

In this embodiment a head 112 of a guide rod 110 is made into a hexagonal prism shape and the internal side of a large diametered portion 118 of a cylindrical portion 116 which is a part of a sliding member 114 is made into a hexagonal fitting hole 119 so as to accommodate the head 112 therein. This mode structure is for preventing mutual relative rotation between the two members. On the other end of the guide rod 110 a male screw 111 is formed as can be seen in FIG. 9. On this male screw 111 a nut 120 having a stepped portion 113 on the external surface thereof is threaded. The stepped portion 113 of the nut 120 receives a seat plate 122 thereon, on which one end of a coil spring 124 is abutted. In this embodiment the spring 124 is gradually compressed by means of screwing up of the nut 120, so the preload applied to the spring 124 can be advantageously adjusted at a desired value by suitably measuring it in the course of gradual increase thereof. When the nut 120 has been exactly positioned, the male screw 111 on the guide rod 110 is squashed or crushed through a hole 126 formed through the wall of the nut 120 so as to surely position the nut 120. It will completely eliminate varying of the biasing force of the spring 124 through the life of the control valve. Besides, the sliding member 114 is fitted in by the head 112 of the guide rod 110 for being well protected from relative rotation between the two when the nut 120 is screwed up.

Figure 10:
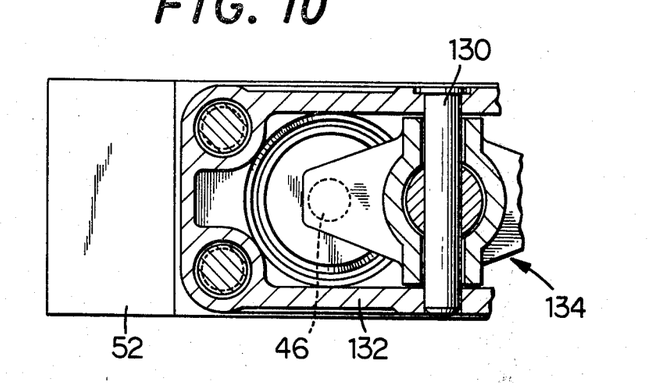
FIGS. 10 and 11 are respectively a transverse sectional bottom view and an axial elevational sectional view of an essential part of another embodiment of the hydraulic pressure control valve.
Figure 11:
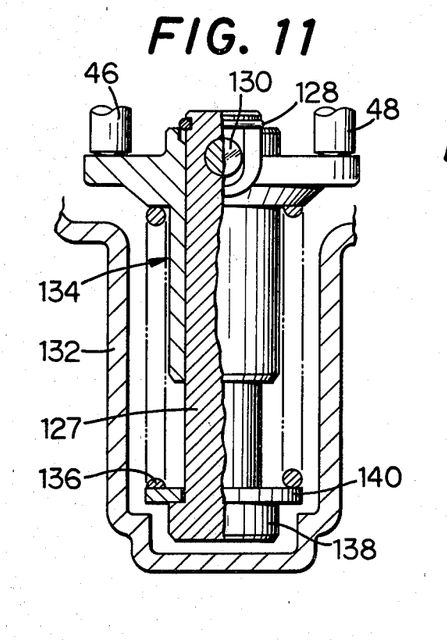
Figure 12:
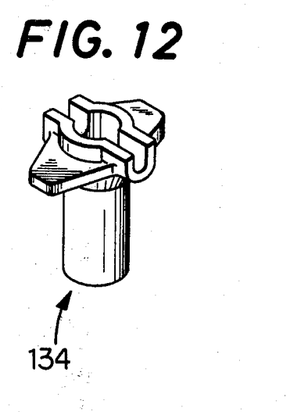
FIG. 12 is a perspective view of a sliding member shown in FIGS. 10 and 11.

According to FIGS. 10-12 showing still another embodiment, on the upper end of a guide rod 127 an annular groove is formed, in which a snap ring 128 projecting in a outward-radial direction is put for preventing a sliding member 134 from being got rid of. The snap ring 128 functions as a projection corresponding to the head 84 previously referred to in its effect. A pivot pin 130 is directly carried by a cover 132 without the help of a bearing. On the other end of the guide rod 127 a projection 138 with a larger diameter is formed on which a seat plate 140 of ring shape is engaged, and a coil spring 136 is anchored between the seat plate 140 and the sliding member 134. In this embodiment, too, the biasing device consisting of the guide rod 127, the sliding member 134, and the coil spring 136 can be put together in advance as a subassembly. The coil spring 136 imparted a preload is put in place together with the cover 132 by being slightly compressed so as to get a desired preload, which has largely improved the assembling efficiency of the hydraulic control valve. Besides, the formation of the annular groove for preventing the getting rid of the sliding member 134 in place of the head projecting radially has largely facilitated the manufacturing of the guide rod 127.

This invention can be applied, in addition to the so-called P valve described above, to a so-called L valve, a limited valve, which is provided with a pair of valve pistons, one end thereof being projected outside, such that a hydraulic pressure of constant force can be produced, regardless of rising of the hydraulic pressure supplied, in response to the biasing force imparted to the valve pistons.

The above description is concerned only to preferred embodiments by way of example, not for limiting the invention to those. It goes without saying that this invention can be varied and modified in many ways within the spirit and scope thereof.

What is claimed is:

1. A hydraulic pressure control valve for a dual-circuit brake system with a pair of independent conduit circuits for respective wheel cylinders on left and right rear wheels of a vehicle so as to deliver a braking hydraulic pressure generated in a master cylinder by operation of a brake operation member, said control valve being provided with a pair of valve pistons for controlling the braking hydraulic pressure delivered to said respective wheel cylinders, said valve pistons each having an axis and being disposed in a housing such that the axes are parallel with one another and projecting at one end thereof out of said housing while being biased inwardly of said housing by a biasing device, said biasing device comprising:

(a) a cover secured to said housing to form an envelope which encloses the projecting ends of said pair of valve pistons;

(b) a guide rod having one end portion pivotally coupled to said cover with a pivot pin and an opposite end portion extending centrally within said cover, said one end portion of said guide rod being positioned between the projecting ends of said pair of valve pistons and pivotable in a plane parallel to a plane including the axis of said pair of valve pistons;

(c) a sliding member including a cylindrical portion slidably fitted on said guide rod and coupled to an action portion positioned to abut each of the projecting ends of said pair of valve pistons;

(d) a spring coupled to said guide rod and surrounded by said cover for urging the action portion of said sliding member into abutment with the projecting ends of said pair of valve pistons to thereby bias said valve pistons; and (e) stopper means disposed on said cover for limiting the pivotal movement of said guide rod in said pivot plane to within a predetermined range of angle as measured from a straight line passing through the axis of said pivot pin and parallel to the axes of said pair of valve pistons, said sliding member and cover being positioned and arranged such that when either one of said pair of independent conduit circuits fails, one of said valve pistons which receives braking hydraulic pressure through the normal conduit circuit rotates said guide rod together with said sliding member until the guide rod abuts on said stopper means and moves said sliding member along the rotated guide rod to resist the biasing force of said spring through said abutting action portion.

2. A hydraulic pressure control valve as claimed in claim 1, wherein said cover is provided with a pair of U-shaped notches open toward said housing which receive and support opposite ends of said pivot pin to permit pivotal movement of said guide rod.

3. A hydraulic pressure control valve as claimed in claim 2, wherein said U-shaped notches are formed face-to-face in diametrically opposite internal wall surfaces of said cover such that the notches are not open outside said cover through the wall thickness thereof.

4. A hydraulic pressure control valve as claimed in claim 1, wherein said spring is a compression spring having one end bearing on said sliding member and the other end bearing on a portion of said guide rod, and said guide rod is provided with a projection extending in a radial direction at said one end portion thereof and engageable with said sliding member to maintain said sliding member under a preloaded condition even when said cover is separated from said housing without said action portion abutting on the projecting ends of said valve pistons.

5. A hydraulic pressure control valve as claimed in claim 4, wherein said spring is coupled to said opposite end of said guide rod by a projection which consists of a snap ring set in an annular groove formed on said guide rod.

6. A hydraulic pressure control valve as claimed in claim 4, wheren said guide rod is provided with a male screw at said opposite end portion thereof and a nut is threaded on said male screw for supporting said other end of said compression spring, a preload applied to said sliding member by said compression spring being adjustable by screwing said nut on said male screw.

7. A hydraulic pressure control valve as claimed in claim 4, wherein said cover has a pair of diametrically opposite U-shaped notches open toward said housing and coupled to receive and support opposite ends of said pivot pin.

8. A hydraulic pressure control valve as claimed in claim 7, wherein said guide rod includes an externally threaded portion at said opposite end portion, and a nut engaging said threaded portion and supporting one end of said compression spring, a preload applied to said sliding member by said compression spring being adjustable by screwing said nut on said threaded portion.

9. A hydraulic pressure control valve as claimed in claim 7, wherein said stopper means comprises an internal surface of said cover, said internal surface being spaced from the opposite end of said guide rod by a distance corresponding to said predetermined range of angle.

10. A hydraulic pressure control valve as claimed in claim 7, wherein said sliding member has a large diameter portion coupled to said cylindrical portion, said large diameter portion having a pair of diametrically opposite U-shaped notches formed through the wall thickness and open toward said housing, said U-shaped notches of the sliding member engaging said pivot pin such that the sliding member is movable axially of the valve pistons and restrained against rotation on said guide rod.

11. A hydraulic pressure control valve as claimed in claim 1 further comprising anti-rotation means for preventing said sliding member from rotating about said guide rod.

12. A hydraulic pressure control valve as claimed in claim 11 wherein said anti-rotation means includes a U-shaped notch formed in said sliding member and engaging said pivot pin while allowing axial movement of said sliding member.

13. A hydraulic pressure control valve as claimed in claim 11, wherein said anti-rotation means includes a polygonal hole formed in one end of said sliding member, and a polygonal head formed in said one end portion of said guide rod and slidably fitted in said polygonal hole.

14. A hydraulic pressure control valve as claimed in claim 1, wherein said stopper means comprises an internal surface of said cover, said internal surface being spaced from the opposite end off said guide rod by a distance corresponding to said predetermined range of angle.

15. A device for biasing the projecting ends of a pair of valve pistons retained parallel to one another within a control valve housing, comprising:

means for providing a cover for enclosing the projecting ends of said valve pistons;

a guide member having first and second end portions and pivotally coupled to said cover at said first end portion, said second end portion extending within said cover;

a sliding member slidably coupled for movement along said guide member and including a first end portion constructed to abut against the projecting ends of the valve pistons;

a spring coupled to the second end of said guide member and enclosed within said cover and positioned to abut against said sliding member in such manner as to provide a biasing force against the projecting ends of said valve pistons;

stopper means disposed within said cover for limiting the pivotal movement of said guide member to a predetermined range.

\* \* \* \* \*